(12) United States Patent
Sauber et al.

(10) Patent No.: US 8,225,030 B2
(45) Date of Patent: Jul. 17, 2012

(54) SYSTEMS AND METHODS FOR USING A PAGE TABLE IN AN INFORMATION HANDLING SYSTEM COMPRISING A SEMICONDUCTOR STORAGE DEVICE

(75) Inventors: William F. Sauber, Georgetown, TX (US); Richard Schuckle, Austin, TX (US); Thomas Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 12/570,949

(22) Filed: Sep. 30, 2009

(65) Prior Publication Data
US 2011/0078369 A1    Mar. 31, 2011

(51) Int. Cl.
*G06F 12/00*    (2006.01)
(52) U.S. Cl. ........................................ 711/104; 711/206
(58) Field of Classification Search .................. 711/104, 711/206
See application file for complete search history.

(56) References Cited

U.S. PATENT DOCUMENTS

| 6,000,006 | A | * | 12/1999 | Bruce et al. ................... 711/103 |
| 6,748,562 | B1 | | 6/2004 | Krech, Jr. et al. |
| 2008/0301256 | A1 | * | 12/2008 | McWilliams et al. ........ 709/214 |
| 2008/0318449 | A1 | * | 12/2008 | Ma et al. ......................... 439/78 |
| 2009/0193184 | A1 | * | 7/2009 | Yu et al. ......................... 711/103 |
| 2010/0064111 | A1 | * | 3/2010 | Kunimatsu et al. ........... 711/161 |
| 2010/0174845 | A1 | * | 7/2010 | Gorobets et al. .............. 711/103 |

FOREIGN PATENT DOCUMENTS
WO    WO/2008/057557    5/2008

* cited by examiner

*Primary Examiner* — Hashem Farrokh
(74) *Attorney, Agent, or Firm* — Baker Botts L.L.P.

(57) ABSTRACT

Systems and methods for using a page table in an information handling system including a semiconductor storage device are disclosed. A page table in an information handling system may be provided. The information handling system may include a memory, and the memory may include a semiconductor storage device. NonDRAM tag data may be stored in the page table. The nonDRAM tag data may indicate one or more attributes of one or more pages in the semiconductor storage device.

16 Claims, 6 Drawing Sheets

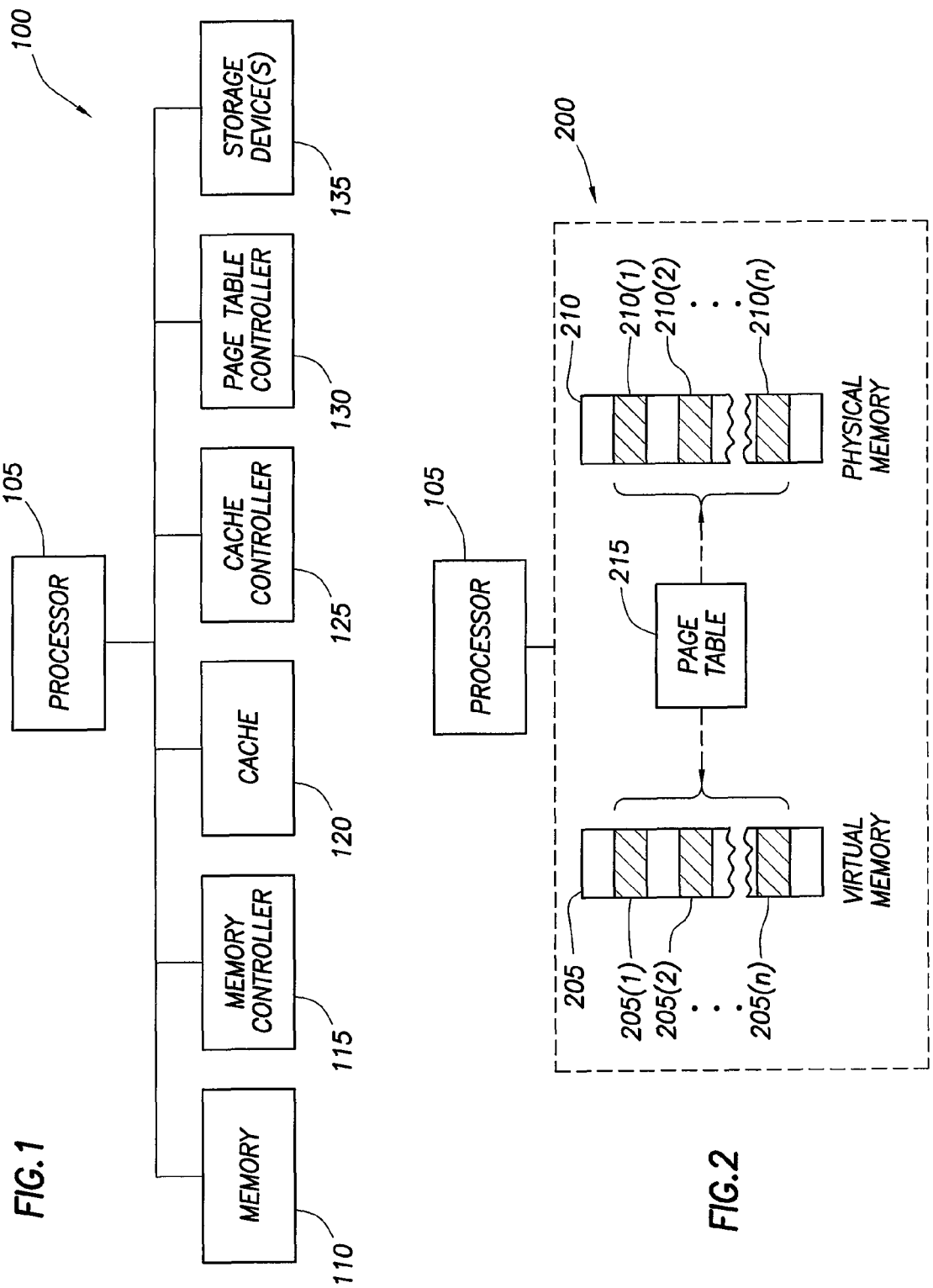

SYSTEMS AND METHODS FOR USING A PAGE TABLE IN AN INFORMATION HANDLING SYSTEM COMPRISING A SEMICONDUCTOR STORAGE DEVICE

TECHNICAL FIELD

The present disclosure relates generally to information handling systems and, more particularly, systems and methods for using a page table in an information handling system comprising a semiconductor storage device.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems may employ a processor, DRAM (dynamic random access memory), and hard disk drives to store persistent data, as well as a storage hierarchy with multiple levels of cache fabricated on a die. A number of semiconductor storage alternatives may be used for cache storage and as a solid-sate drive (SSD) to store persistent data. Flash memory, for example, may be used to provide intermediate cache storage under control of an operating system or a number of device drivers and to provide faster storing of persistent data. In certain cases, flash memory may provide a cost per bit and/or a power rating between those of high capacity disks and DRAM.

One problem related to use of flash memory and other semiconductor storage alternatives is memory wear. Flash memory, for example, may withstand only a limited number erase-write cycles before its integrity begins to deteriorate. Relative to DRAM, flash memory may be vulnerable to memory wear with a small number of write cycles. One approach to mitigating wear problems is wear leveling. Wear leveling is a technique where an attempt is made to evenly distribute the number of erase-write cycles across memory blocks, in order to avoid a concentration of erase-write cycles.

Another problem related to semiconductor storage technologies is speed of access. Relative to DRAM, semiconductor storage alternatives may be slower and may exhibit a wide range of response times. The problem of access speed may be further complicated by an increased vulnerability to memory wear due to caching.

Another problem related to these technologies is block access. Semiconductor storage devices, such as flash memory, may not operate efficiently unless accessed in blocks that may be large relative to DRAM. A single flash device may encounter a latency penalty when smaller blocks are read. When multiple devices are accessed in parallel, the latency penalty may be exacerbated.

SUMMARY

In one aspect, a method for using a page table in an information handling system including a semiconductor storage device is disclosed. A page table in an information handling system may be provided. The information handling system may include a memory, and the memory may include a semiconductor storage device. NonDRAM tag data may be stored in the page table. The nonDRAM tag data may indicate one or more attributes of one or more pages in the semiconductor storage device.

In another aspect, a computer program, stored in a tangible medium for using a page table in an information handling system comprising a semiconductor storage device, is disclosed. The computer program may include executable instructions to cause at least one processor to: provide a page table in an information handling system that may include a memory, which may include a semiconductor storage device; and store nonDRAM tag data in the page table, where the nonDRAM tag data may indicate one or more attributes of one or more pages in the semiconductor storage device.

In another aspect, an information handling system is disclosed. The information handling system may include a processor communicatively coupled to a memory. The memory may include a semiconductor storage device. The information handling system may include a computer readable medium. The computer readable medium may include instructions that cause the at least one processor to: provide a page table in the information handling system; and store nonDRAM tag data in the page table, where the nonDRAM tag data indicates one or more attributes of one or more pages in the semiconductor storage device.

Thus, the present disclosure provides methods and systems for efficiently using flash memory and other semiconductor storage alternatives to DRAM. The present disclosure provides for methods and systems trigger and utilize hardware and/or software to efficiently address wear leveling, speed of access, caching, block access, and other unique aspects of semiconductor storage alternatives. Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is an exemplary block diagram showing an information handling system in accordance with certain embodiments of the present disclosure;

FIG. 2 is an exemplary block diagram showing a processor in communication with a memory management subsystem in accordance with certain embodiments of the present disclosure;

DETAILED DESCRIPTION

Figure 3:
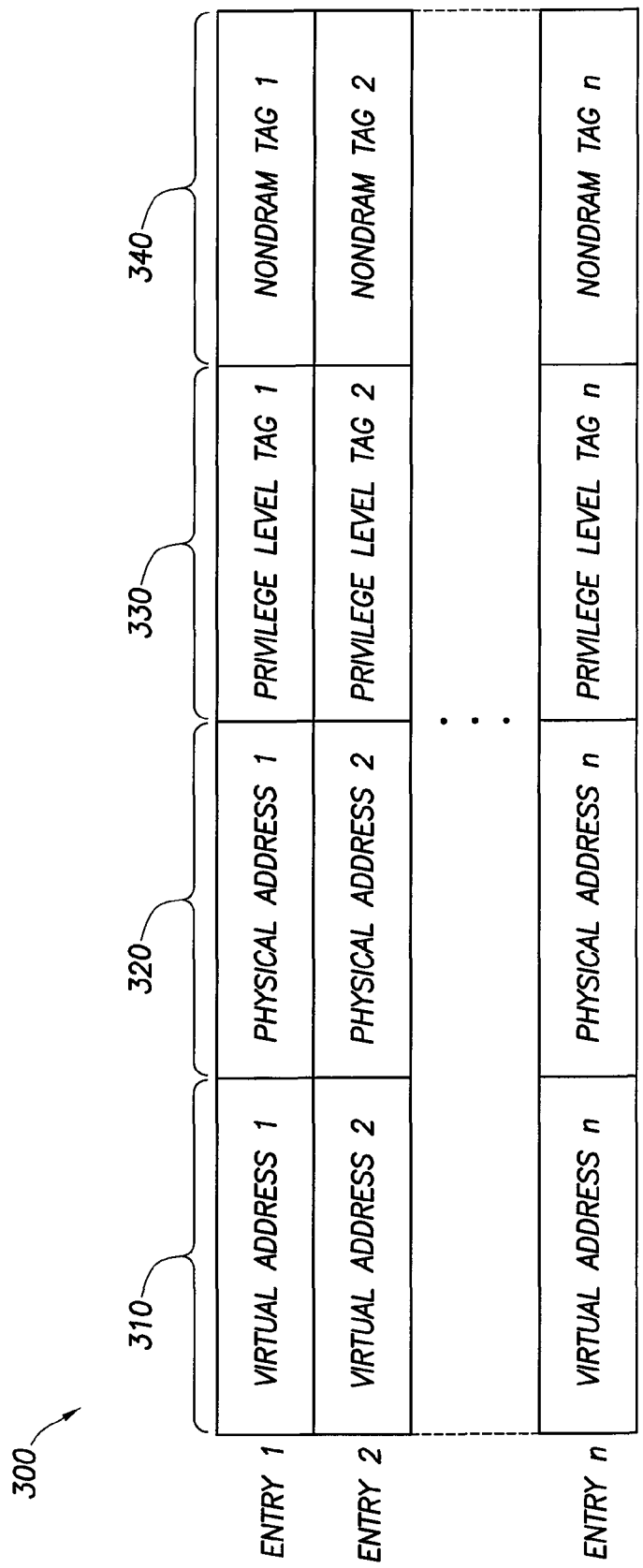
FIG. 3 is an exemplary illustration of a page table in accordance with certain embodiments of the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system according to certain embodiments of the present disclosure, indicated generally at 100. As depicted in FIG. 1, information handling system 100 may include processor 105, memory 110, memory controller 115, cache 120, cache controller 125, page table controller 130, and one or more storage devices 135. Processor 105 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 105 may interpret and/or execute program instructions and/or process data stored in memory 110, cache(s) 120, and/or another component of information handling system 100 and may output results, graphical user interfaces (GUIs), websites, and the like via a display or over a network port.

Memory 110 may include any system, device, or apparatus configured to retain program instructions and/or data for a period of time (e.g., computer-readable media). Memory 110 may typically include random access memory (RAM), such as DRAM (Dynamic RAM) and/or SRAM (Static RAM), and/or other storage devices that may require power to maintain stored data. For example, memory 110 may include electrically erasable programmable read-only memory (EEPROM), a PCMCIA card, or any suitable selection and/or array of volatile and/or non-volatile memory configured to retain data after power to information handling system 100 is turned off. In accordance with certain embodiments of the present disclosure, memory 110 may include flash memory, phase change memory and/or other semiconductor storage alternatives.

One or more caches 120 may be coupled to one or more components of information handling system 100. For example, cache 120 may be coupled to processor 105 and/or cache controller 125. Cache 120 may comprise any system, device, or apparatus operable to retain program instructions or data for a period of time. In accordance with certain embodiments of the present disclosure, cache 120 may include (SRAM) static random access memory and/or other semiconductor storage alternatives.

Cache controller 125 may be communicatively coupled to processor 105, cache 120, memory controller 115, page table controller 125, and/or storage device(s) 135. Cache controller 125 may include any hardware, software, and/or firmware configured to control 120 and the data transfer to and from cache 120. In the same or alternative embodiments, cache controller 125 may be configured to control data transfer between components of cache 120.

One or more storage devices 135 may be any system, device, or apparatus operable to retain program instructions or data for a period of time. A storage device 135 may include any combination of hard disk drives, magnetic tape libraries, optical disk drives, magneto-optical disk drives, compact disk drives, compact disk arrays, disk array controllers, solid state drives, and/or any computer-readable medium operable to store data. In certain embodiments, storage device(s) 135 may include or be an integral part of an array of storage devices (e.g., a RAID).

A power source (not shown) may include any system, device, or apparatus configured to and provide electrical energy to one or more components of information handling system 100. In certain embodiments, a power source may include an alternating current (AC) or direct current (DC) source wherein electrical energy is provided from an electrical outlet (e.g., a 120-volt wall outlet). In certain embodiments, a power source may include a battery that stores electrochemical energy and provides electrical energy to one or more components of information handling system 100. For example, a power source may be a rechargeable battery, meaning that its electrochemical energy may be restored by the application of electrical energy (e.g., a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing, or any other suitable battery). In operation, a power source may provide electrical energy to one or more electrical or electronic components (e.g., processor 105, memory 110, memory controller 115, cache 120, cache controller 125, page table controller 125, and one or more storage devices 135) supplemental to or in lieu of a "main" power source of information handling system 100 (e.g., electrical power provided via an electrical outlet or a main system battery of information handling system 100).

FIG. 2 illustrates an example block diagram of processor 105 in communication with memory management subsystem 200 according to certain embodiments of the present disclosure. Virtual memory 205 may address one or more portions of memory 110, cache 120 and/or storage device 135. Memory system program space may be organized into regions of virtual memory 205 called pages. Pages associated with a particular program may represent the virtual memory for a given program. FIG. 2 shows exemplary virtual pages 205(1) to 205(n). In operation, by way of example but not limitation, virtual memory 200 may map data store, data load, and instruction fetch addresses for processor 105. In some embodiments, memory management 200 may be controlled by an operating system.

Page table 215 may store a list of physical memory pages and may map virtual pages 205(1) to 205(n) to physical memory 210 pages 210(1) to 210(n), which may be regions of memory 110, cache 120 and/or storage device 135. Hardware support may be provided to translate virtual addresses to physical addresses. For example, one or more hardware components may perform address look-up, address fault checking, and/or communication of addresses/fault conditions to other components of an information handling system.

FIG. 3 shows an example representation of page table 300 to illustrate certain embodiments of the present disclosure. Page table 300 may include a list of entries, represented as rows in FIG. 3 by Entry 1 to Entry n. Each entry may map a virtual address in column 310 to a physical memory address in column 320. In certain embodiments, an entry may include a privilege level tag, represented in column 330, associated with an address translation. A privilege level tag may include supplemental information that may indicate accesses allowed (e.g., read, write, execute) and may distinguish between an operating system and application.

Page table 300 may further include one or more nonDRAM tags, represented in column 340, for one or more entries. NonDRAM tags and tag data may support various features and/or an architecture for pages in memory types other than DRAM. For example, attributes of other technologies, such as flash memory, may require various software and/or hardware features to implement the other technologies. NonDRAM tags and tag data may invoke software and/or hardware to handle properly the attributes of flash or other nonDRAM memory.

A nonDRAM tag and its corresponding nonDRAM tag data may expose attributes of an associated physical page. For example without limitation, those attributes may include wear leveling requirements, slow/nondeterministic access delay, block mode technology and/or nonvolatile technology. NonDRAM tags and tag data may represent attributes of more than one type of storage technology. Software traps and/or hardware may be activated to handle references to addresses with tags indicating these attributes.

NonDRAM tag data may include data that indicates that wear leveling is required. Based on such tag data, wear leveling signals may be communicated, for example, to one or more of the page table controller 130, cache controller 125 and memory access controller 115 in order to accommodate the wear leveling requirements. NonDRAM tag data may include data that indicates that a given access is a slow and/or nondeterministic access, as may be the case with a large block access which may have a long latency. Based on such tag data, for example, an operating system may be notified accordingly. NonDRAM tag data may include data that indicates large line attributes. Based on such tag data, for example, large line signals may be communicated, for example, to one or more of the page table controller 130, cache controller 125 and memory access controller 115 in order to accommodate the block mode access.

In certain embodiments, information indicating nonvolatility may reside in the on-die page table cache, and/or in a software data structure that may include an uncached portion of page table 300 considering that it may be needed on power state transitions. Stated otherwise, a full page table may not be required to be resident in the processor. It may be stored in memory or disk. For infrequent activities, e.g., those involving nonvolatility, additional page table data in memory or on disk could be used.

Figure 4:
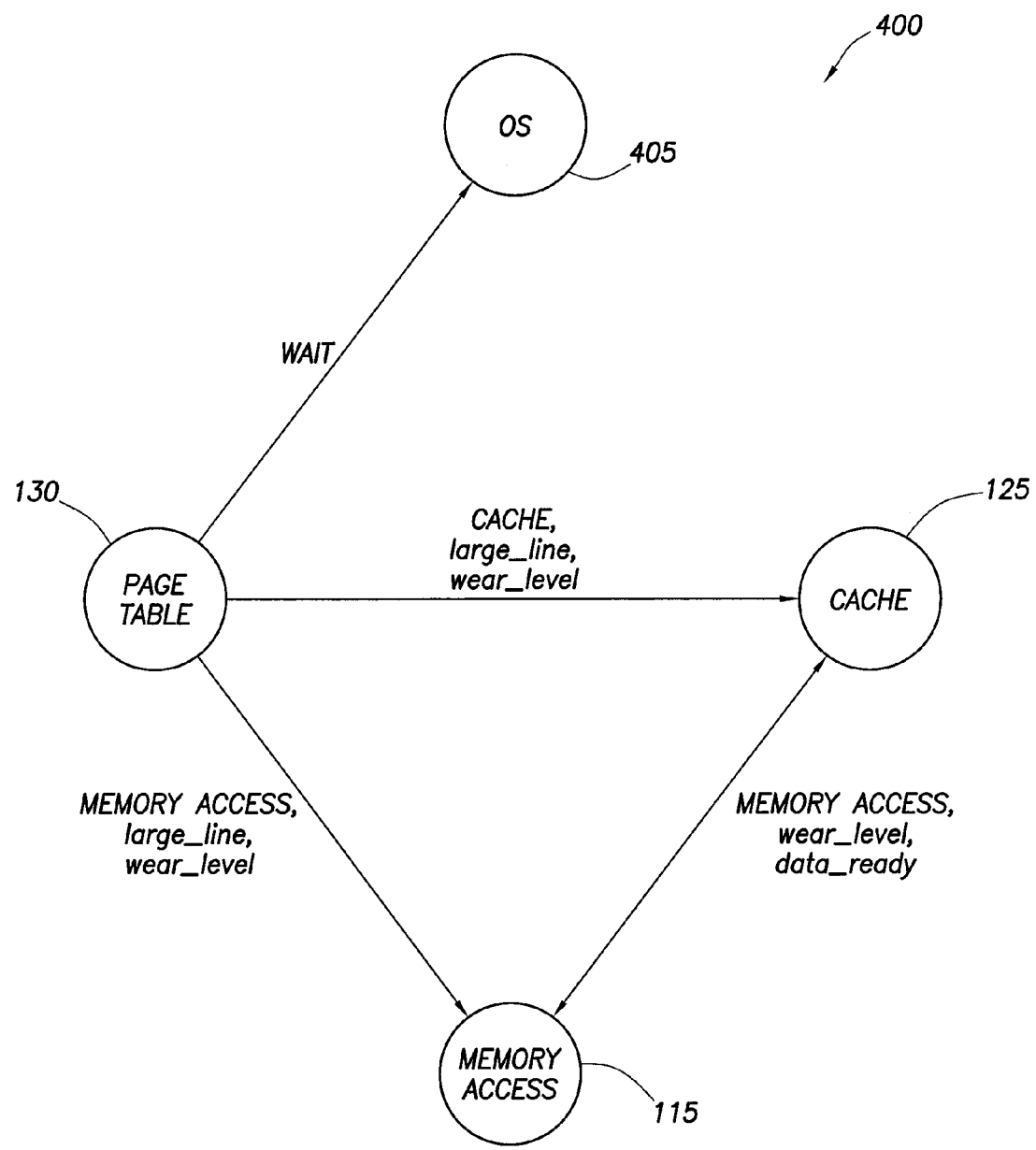
FIG. 4 is an exemplary controller diagram in accordance with certain embodiments of the present disclosure.

FIG. 4 is an exemplary controller diagram 400 illustrating communications of an information handling system employing a page table structure, such as page table 300, with non-DRAM tag information. Memory controller 115, cache controller 125, page table controller 130, and operating system (OS) 405 may be communicatively coupled. When one or more entries in page table 300 are accessed, one or more nonDRAM tags may trigger certain actions within processor 105. For example, one or more of memory or cache may be accessed, and memory may be accessed to support the cache. Communications between page table controller 130, memory controller 115 and cache controller 125 may include, for example, sending and receiving information and/or instructions for wear leveling, data stores, data fetches, data status and/or operation status.

In the example of FIG. 4, nonDRAM tag data for one or more pages may indicate block mode and/or wear leveling characteristics. Page table controller 130 may examine the nonDRAM tag data and, based on that tag data, may indicate to cache controller 125 and/or memory access controller 115 that block mode and/or wear leveling is required. Such communications are represented in FIG. 4 by "large_line" and "wear_level" signals. The communications may comprise the nonDRAM tag data, encoded nonDRAM tag data or other signals based on the tag data.

In certain embodiments, semiconductor storage devices may be slower and may exhibit a wide range of response times. It may be advantageous treat accesses to these devices using a command with interrupt on complete model. Page table controller 130 may determine from nonDRAM tag data that a given access may have a long latency. In such a case, page table controller 130 may indicate a slow access to operating system 405, which is represented by the "wait" signal or interrupt in FIG. 4.

Cache controller 125 and/or memory access controller 115 may perform a variety of access control methods to handle reads, writes and/or executes, and to accommodate large line and/or wear leveling requirements. Communications between cache controller 125 and memory access controller 115 are represented in the example by "wear_level" and "data_ready" signals, which may respectively indicate or initiate wear leveling and indicate data status. Exemplary communicative interactions between components of controller diagram 400 are described in further detail below with respect to FIGS. 5, 6 and 7.

Figure 5:
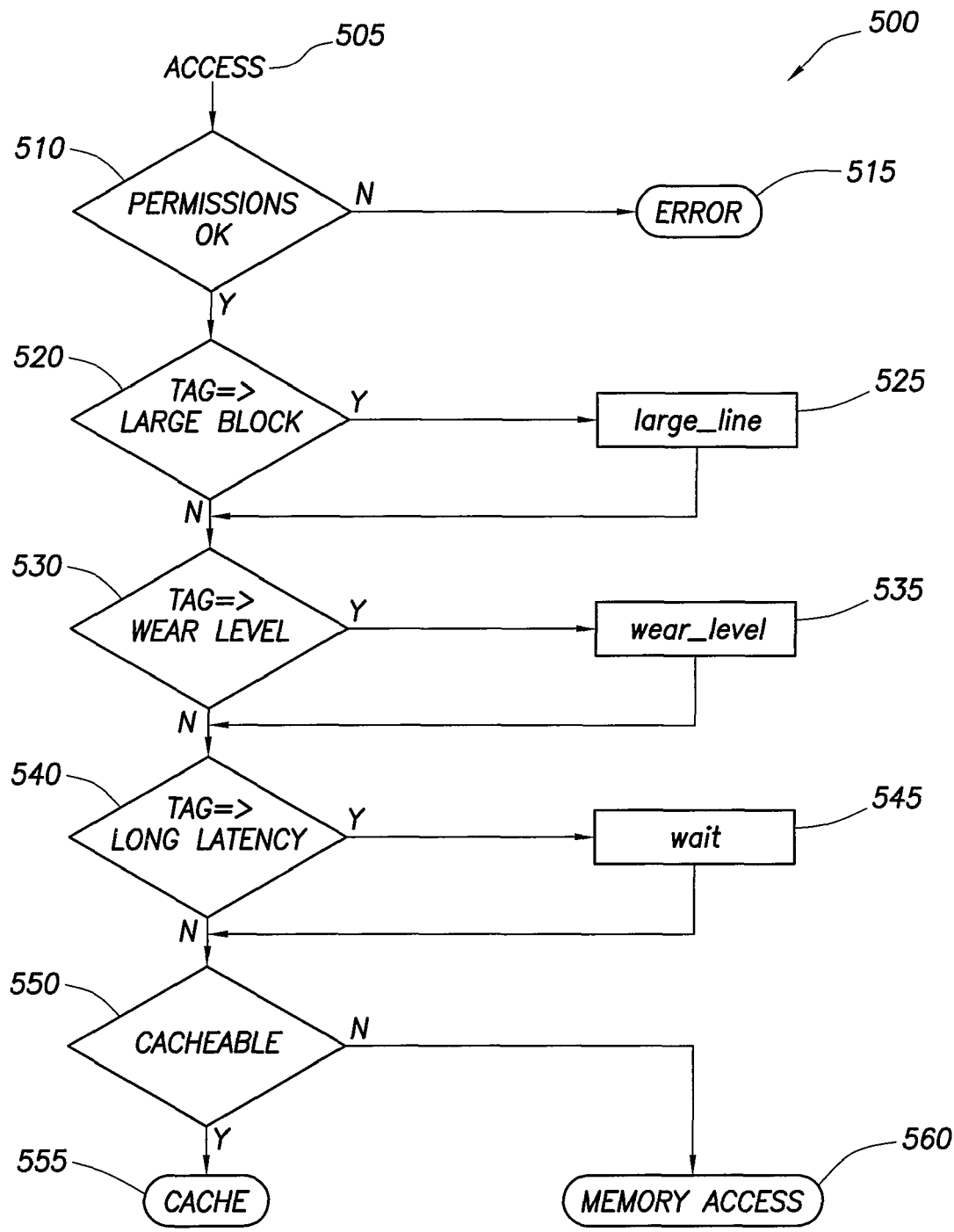
FIG. 5 is a process flow diagram illustrating an access method in accordance with certain embodiments of the present disclosure.

FIG. 5 shows an access method 500 for one example implementation of page table 300 in accordance with certain embodiments of the present disclosure. Access method 500 begins with an access signal at step 505. At step 510, an allowable access privilege level (e.g., read, write, execute) may be determined based on privilege level tag data in page table 300. For example, if a write access is indicated for a given page when a standard tag indicates only a read privilege level, an error may result at step 515. If the access is allowed, access method 500 may continue to step 520.

At step 520, it may be determined whether data is organized in large blocks, as may be the case in some technologies, based at least in part on nonDRAM tag information. If that is the case, then at step 525 signals indicating block mode may be communicated to cache controller 125 and/or memory controller 115. To accommodate block mode, communication lines may be combined and/or multiple accesses may be needed. At step 530, wear leveling requirements may be determined based at least in part on nonDRAM tag information. If wear leveling is required, then at step 535 it may be communicated to cache controller 125 that a cache wear level tag should be set, and it may be communicated to memory controller 115 that hardware or a software wear leveling program should be invoked. At step 540, whether long latency is a factor may be determined based at least in part on non-DRAM tag information. If long latency is a factor, an operating system may be informed at step 545 that an extended access operation is in progress. At step 550, whether memory is cacheable may be determined. If so, then a cache method may be initiated at step 555. Otherwise, a memory access method may be initiated at step 560.

Figure 6:
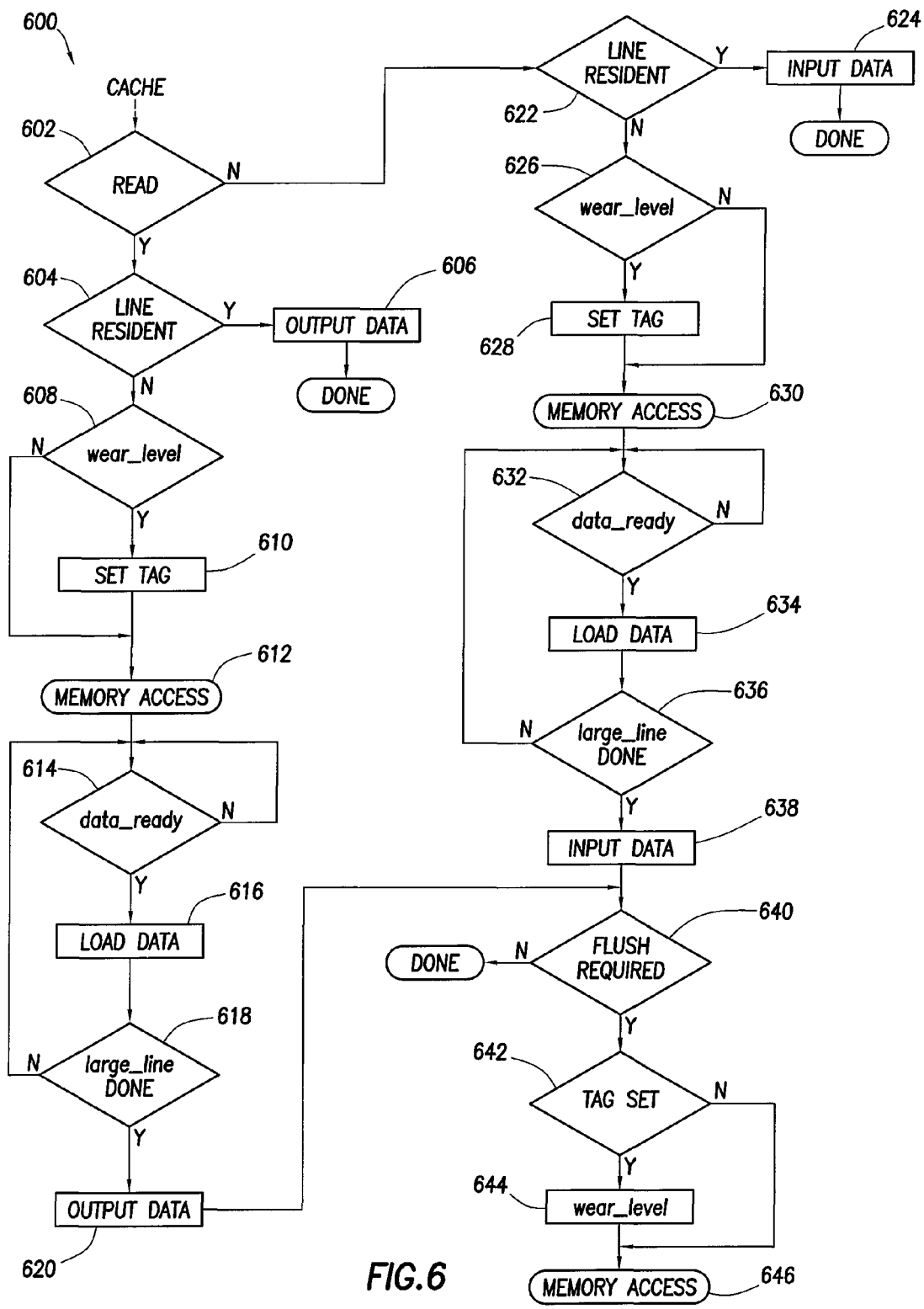
FIG. 6 is a process flow diagram illustrating a cache access method in accordance with certain embodiments of the present disclosure.

FIG. 6 shows an exemplary cache controller method 600 in accordance with certain embodiments of the present disclosure. At step 602, whether the access is a read may be determined. If the access is a read, whether the data is resident may be determined at step 604. If the data has already been fetched and is in the cache, the data may be transferred to an execution pipeline of processor 105 from the cache at step 606, and cache controller method 600 may end. If the data is not resident, whether wear leveling is required may be determined at step 608. If wear leveling is required, a wear level tag for the particular line may be set at step 610. In that way, the cache may maintain a wear level tag on a per line basis, whereas page table 300 may track wear leveling requirements on a per page basis. Cache controller method 600 may invoke memory access controller method 700 at step 612 and continue to step 614. From that point, cache controller method 600 may not proceed until there is an indication that the data is ready—e.g., by way of a "data_ready" flag being set by memory access controller method 700. Once the data_ready flag is set, data may be loaded at step 616.

Cache and memory access control may use a fixed number of lines for large line support. If nonDRAM tag data indicates a large line requirement, multiple standard lines, e.g., DRAM sized lines may be transferred. At step 618, it may be determined whether a large line transfer, if any, is complete. If a large line transfer is complete or if there is no large line transfer, the data may be transferred to an execution pipeline from the cache at step 620. Cache controller method 600 may continue to step 640.

Turning back to step 602, if the access is not a read, method 700 may continue to step 622. At step 622, it may be determined whether the data is resident. If the data has been fetched and is in the cache, the data may be transferred from an execution pipeline to the cache at step 624, and cache controller method 600 may end. If the data is not resident, whether wear leveling is required may be determined at step 626. If wear leveling is required, a wear level tag for the particular line may be set at step 628.

Cache controller method 600 may invoke memory access controller method 700 at step 630 and continue to step 632. Cache controller method 600 may then loop until there is an indication that the data is ready. Once the data_ready flag is set, data may be loaded from cache to memory at step 634. At step 636, it may be determined whether a large line transfer, if any, is complete. If a large line transfer is complete or if there is no large line transfer, the data may be transferred from an execution pipeline to the cache at step 638. Memory access controller method 700 may then continue to step 640.

At step 640, it may be determined whether sufficient space is available in cache. If sufficient cache is available, then no flush may be required, and method 600 may end. If sufficient cache is not available, then a flush of one or more lines may be required in order to ensure space for a potential subsequent access.

Where semiconductor storage devices are configured for caching, accesses requiring a cache flush may require wear leveling. At step 642, the wear level tag for the particular line may be checked. If the tag is set per steps 610 or 628, then the wear_level tag is set at step 644. At step 646, cache controller method 600 may invoke memory access controller method 700.

Figure 7:
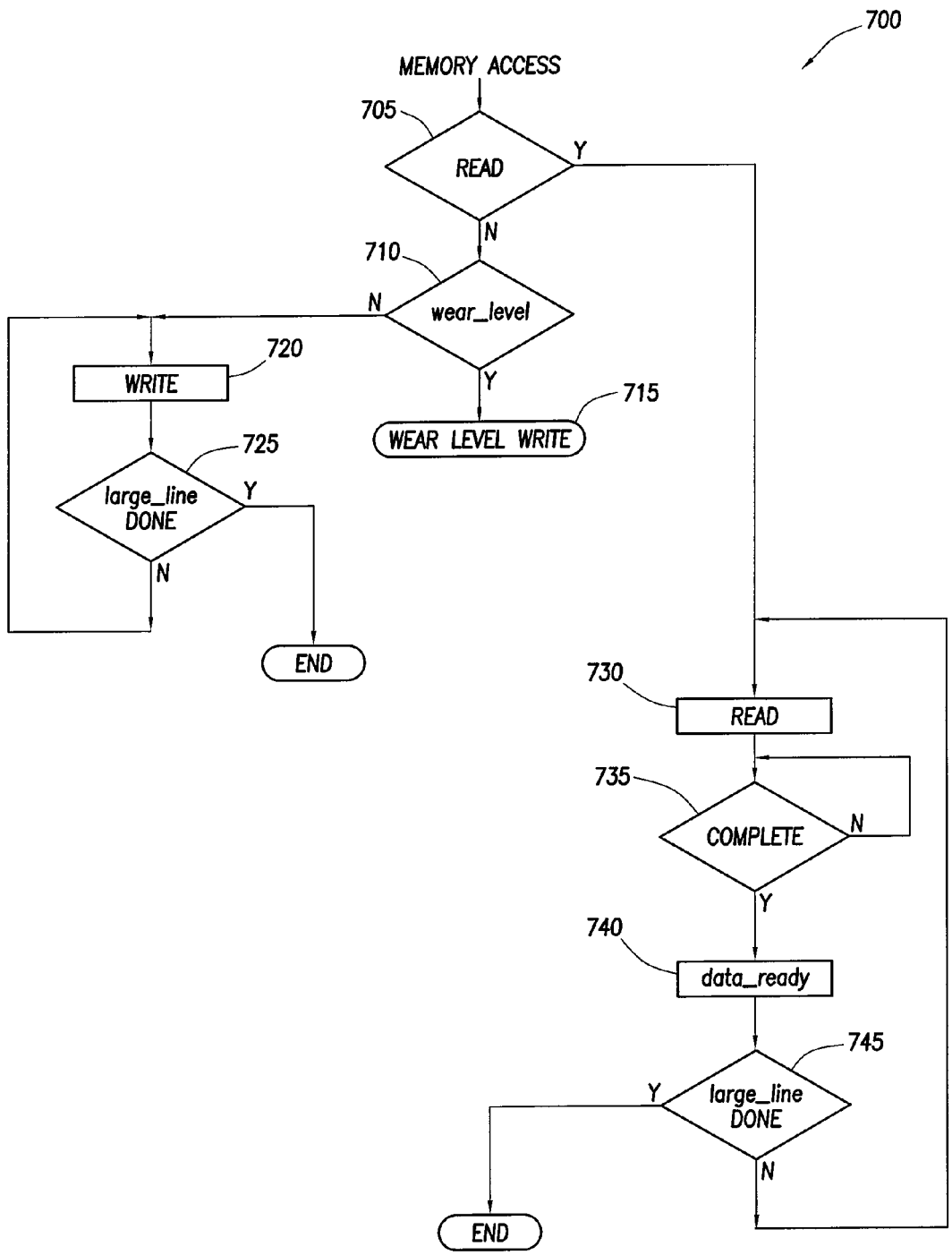
FIG. 7 is a process flow diagram illustrating a memory access method in accordance with certain embodiments of the present disclosure.

FIG. 7 shows an exemplary memory controller method 700 in accordance with certain embodiments of the present disclosure. At step 705, whether the access is a read may be determined. If the access is a read, then data may be requested from memory at step 730. At step 735, it may be determined whether the requested data has been returned from memory. If the data transfer is not complete, method 700 loops back to step 735. When the data transfer is complete, an indication that the data is ready is given at step 740—e.g., by way of a "data_ready" signal being sent. Once the data_ready signal is sent, it may be determined whether a large line transfer, if any, is complete at step 745. If the large line transfer is complete or if the transfer is not large line, then method 700 may end. If the large line transfer is not complete, then method 700 may loop back to step 730.

Turning back to step 705, method 700 continues to step 710 if the access is not a read. If wear leveling is required, a write may be performed with wear leveling at step 715. Method 700 may invoke wear level support, which may be software and/or hardware. Wear leveling may include any technique whereby data is written in a manner that tends to evenly distribute the number of erase-write cycles across memory blocks so that a concentration of high frequency use of a particular memory block, relative to other memory blocks, is avoided. If wear leveling is not required, then data may be transferred to memory from cache or the execution pipeline at step 720. At step 725, it may be determined whether a large line transfer, if any, is complete. If the large line transfer is not complete, then method 700 may loop back to step 720 for further data transfer. If the large line transfer is complete or if the transfer is not large line, then method 700 may end.

Thus, the present disclosure provides methods and systems for efficiently using flash memory and other semiconductor storage alternatives to DRAM. The present disclosure provides for methods and systems trigger and utilize hardware and/or software to efficiently address wear leveling, speed of access, caching, block access, and other unique aspects of semiconductor storage alternatives. Other technical advantages will be apparent to those of ordinary skill in the art in view of the specification, claims and drawings.

Although the present disclosure has been described in detail, it should be understood that various changes, substitutions, and alterations can be made hereto without departing from the spirit and the scope of the invention as defined by the appended claims. Various changes, substitutions, and alterations can be made to interfaces with multiple devices at one end and a single device at the other end without departing from the spirit and the scope of the invention.

What is claimed is:

1. A method for using a page table in an information handling system comprising a semiconductor storage device, the method comprising:
    providing a page table in an information handling system, wherein the information handling system comprises a memory, and wherein the memory comprises a semiconductor storage device;
    storing nonDRAM tag data in the page table, wherein the nonDRAM tag data indicates one or more attributes of one or more pages in the semiconductor storage device, and wherein the nonDRAM tag data indicates whether block mode access is required; and
    notifying an operating system of the information handling system of an access delay.

2. The method of claim 1, wherein the nonDRAM tag data indicates whether wear leveling is required.

3. The method of claim 2, further comprising:
    based, at least in part, on the nonDRAM tag data, writing data to the memory, wherein the writing is performed in a manner consistent with a wear leveling technique.

4. The method of claim 3, wherein the information handling system further comprises a cache, the method further comprising:
    based, at least in part, on the nonDRAM tag data, accessing the cache, wherein the accessing comprises tracking, on a per line basis, whether wear leveling is required.

5. The method of claim 1, further comprising:
    based, at least in part, on the nonDRAM tag data, accessing memory, wherein the accessing transfers multiple standard lines for each block mode access.

6. A computer program, stored in a tangible medium for using a page table in an information handling system comprising a semiconductor storage device, comprising executable instructions to cause at least one processor to:
    provide a page table in an information handling system, wherein the information handling system comprises a memory, and wherein the memory comprises a semiconductor storage device;
    store nonDRAM tag data in the page table, wherein the nonDRAM tag data indicates one or more attributes of one or more pages in the semiconductor storage device, and wherein the nonDRAM tag data indicates whether block mode access is required; and
    notify an operating system of the information handling system of an access delay.

7. The computer program of claim 6, wherein the nonDRAM tag data indicates whether wear leveling is required.

8. The computer program of claim 7, wherein the computer program further comprises executable instructions to cause the at least one processor to:
    based, at least in part, on the nonDRAM tag data, write data to the memory, wherein the writing is performed in a manner consistent with a wear leveling technique.

9. The computer program of claim 8, wherein the computer program further comprises executable instructions to cause the at least one processor to:
    based, at least in part, on the nonDRAM tag data, access a cache within the information handling system, wherein the accessing comprises tracking, on a per line basis, whether wear leveling is required.

10. The computer program of claim 6, wherein the computer program further comprises executable instructions to cause the at least one processor to:
    based, at least in part, on the nonDRAM tag data, access memory, wherein the accessing transfers multiple standard lines for each block mode access.

11. The computer program of claim 10, wherein the computer program further comprises executable instructions to cause the at least one processor to:
    based, at least in part, on the nonDRAM tag data, access a cache within the information handling system, wherein the accessing comprises transferring multiple standard lines for each block mode access.

12. An information handling system, comprising:
    a processor communicatively coupled to a memory, wherein the memory comprises a semiconductor storage device; and
    a computer readable medium comprising instructions that cause the at least one processor to:
        provide a page table in the information handling system;
        store nonDRAM tag data in the page table, wherein the nonDRAM tag data indicates one or more attributes of one or more pages in the semiconductor storage device, and wherein the nonDRAM tag data indicates whether block mode access is required; and
        notify an operating system of the information handling system of an access delay.

13. The information handling system of claim 12, wherein the nonDRAM tag data indicates whether wear leveling is required.

14. The information handling system of claim 13, where the instructions further cause the at least one processor to:
    based, at least in part, on the nonDRAM tag data, write data to the memory, wherein the writing is performed in a manner consistent with a wear leveling technique.

15. The information handling system of claim 14, wherein the instructions further cause the at least one processor to:
    based, at least in part, on the nonDRAM tag data, access a cache within the information handling system, wherein the accessing comprises tracking, on a per line basis, whether wear leveling is required.

16. The information handling system of claim 12, wherein the instructions further cause the at least one processor to:
    based, at least in part, on the nonDRAM tag data, access memory, wherein the accessing transfers multiple standard lines for each block mode access.

* * * * *